(12) United States Patent
Paya et al.

(10) Patent No.: US 7,685,631 B1
(45) Date of Patent: Mar. 23, 2010

(54) AUTHENTICATION OF A SERVER BY A CLIENT TO PREVENT FRAUDULENT USER INTERFACES

(75) Inventors: Ismail Cem Paya, Seattle, WA (US); Trevin Chow, Redmond, WA (US); Christopher N. Peterson, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 1453 days.

(21) Appl. No.: 10/358,814

(22) Filed: Feb. 5, 2003

(51) Int. Cl.
 H04L 9/00 (2006.01)
 H04L 9/32 (2006.01)
 H04N 7/16 (2006.01)
(52) U.S. Cl. ............... 726/8; 726/30; 726/27; 726/5
(58) Field of Classification Search ........ 726/2–4, 726/9, 21, 26–30, 5, 8
 See application file for complete search history.

(56) References Cited

U.S. PATENT DOCUMENTS

| | | | |
|---|---|---|---|
| 5,875,296 A * | 2/1999 | Shi et al. ................ 726/5 |
| 5,889,942 A | 3/1999 | Orenshteyn |
| 5,918,228 A * | 6/1999 | Rich et al. ............... 707/10 |
| 5,944,824 A * | 8/1999 | He ........................ 726/6 |
| 6,006,332 A * | 12/1999 | Rabne et al. .............. 726/6 |
| 6,073,241 A * | 6/2000 | Rosenberg et al. ......... 726/3 |
| 6,195,698 B1 | 2/2001 | Lillibridge et al. |
| 6,226,752 B1 * | 5/2001 | Gupta et al. .............. 726/9 |
| 6,253,325 B1 | 6/2001 | Steele et al. |
| 6,314,425 B1 * | 11/2001 | Serbinis et al. ........... 707/10 |
| 6,374,359 B1 * | 4/2002 | Shrader et al. ............ 726/5 |
| 6,421,781 B1 * | 7/2002 | Fox et al. ................ 726/4 |
| 6,438,600 B1 * | 8/2002 | Greenfield et al. ........ 709/229 |
| 6,463,474 B1 * | 10/2002 | Fuh et al. ............... 709/225 |
| 6,484,257 B1 | 11/2002 | Ellis |
| 6,598,167 B2 * | 7/2003 | Devine et al. ............ 726/8 |
| 6,678,828 B1 * | 1/2004 | Pham et al. .............. 726/2 |
| 6,820,201 B1 | 11/2004 | Lincoln et al. |
| 6,823,454 B1 | 11/2004 | Hind et al. |
| 6,851,060 B1 * | 2/2005 | Shrader .................. 726/10 |
| 6,947,992 B1 | 9/2005 | Shachor |
| 6,954,799 B2 * | 10/2005 | Lerner ................... 709/240 |
| 7,036,142 B1 | 4/2006 | Zhang et al. |
| 7,100,049 B2 * | 8/2006 | Gasparini et al. ......... 713/170 |
| 7,100,054 B2 | 8/2006 | Wenisch et al. |
| 7,111,789 B2 | 9/2006 | Rajasekaran et al. |
| 7,251,827 B1 * | 7/2007 | Guo et al. ............... 726/8 |
| 7,287,003 B2 * | 10/2007 | Hodson et al. ............ 705/26 |

(Continued)

OTHER PUBLICATIONS

Fielding et al. "Hypertext Transfer Protocol—HTTP/1.1", RFC 2616. Jun. 1999.*

(Continued)

*Primary Examiner*—Zachary A Davis
(74) *Attorney, Agent, or Firm*—Senniger Powers LLP

(57) ABSTRACT

Protecting a user against web spoofing in which the user confirms the authenticity of a web page prior to submitting sensitive information such as user credentials (e.g., a login name and password) via the web page. The web page provides the user with an identifiable piece of information representing a shared secret between the user and the server. The user confirms the correctness of the shared secret to ensure the legitimacy of the web page prior to disclosing any sensitive information via the web page.

17 Claims, 8 Drawing Sheets

U.S. PATENT DOCUMENTS

| | | | |
|---|---|---|---|
| 7,346,775 B2 * | 3/2008 | Gasparinl et al. | 713/170 |
| 7,360,092 B1 * | 4/2008 | Peterson et al. | 713/175 |
| 7,467,298 B2 * | 12/2008 | Mitchell et al. | 713/168 |
| 7,562,222 B2 * | 7/2009 | Gasparini et al. | 713/170 |
| 2001/0045451 A1 | 11/2001 | Tan et al. | |
| 2001/0054155 A1 * | 12/2001 | Hagan et al. | 713/193 |
| 2002/0029350 A1 * | 3/2002 | Cooper et al. | 713/200 |
| 2002/0112183 A1 * | 8/2002 | Baird et al. | 713/201 |
| 2002/0152380 A1 * | 10/2002 | O'Shea et al. | 713/170 |
| 2002/0152384 A1 | 10/2002 | Shelest et al. | |
| 2002/0194501 A1 | 12/2002 | Wenocur et al. | |
| 2003/0033545 A1 | 2/2003 | Wenisch et al. | |
| 2003/0093699 A1 | 5/2003 | Banning et al. | |
| 2003/0097592 A1 | 5/2003 | Adusumilli | |
| 2003/0188193 A1 | 10/2003 | Venkataramappa | |
| 2004/0003084 A1 * | 1/2004 | Malik et al. | 709/225 |
| 2004/0019808 A1 * | 1/2004 | Devine et al. | 713/201 |
| 2004/0030934 A1 | 2/2004 | Mizoguchi et al. | |
| 2004/0068665 A1 * | 4/2004 | Fox et al. | 713/201 |
| 2004/0098616 A1 | 5/2004 | Jenner et al. | |
| 2004/0123160 A1 | 6/2004 | Mizrah | |
| 2004/0128546 A1 * | 7/2004 | Blakley et al. | 713/201 |
| 2004/0225878 A1 | 11/2004 | Costa-Requena et al. | |
| 2005/0074126 A1 | 4/2005 | Stanko | |
| 2005/0114712 A1 * | 5/2005 | Devine et al. | 713/201 |
| 2005/0149759 A1 * | 7/2005 | Vishwanath et al. | 713/201 |
| 2005/0216582 A1 | 9/2005 | Toomey et al. | |
| 2005/0216771 A1 * | 9/2005 | Malcolm | 713/201 |
| 2005/0235341 A1 | 10/2005 | Stieglitz et al. | |
| 2007/0277235 A1 * | 11/2007 | Barrett et al. | 726/12 |
| 2008/0080711 A1 | 4/2008 | Gagnon et al. | |
| 2008/0256364 A1 | 10/2008 | Chang et al. | |

OTHER PUBLICATIONS

Masood, "15 Seconds: Fighting Spambots with .Net and AI," Online, Feb. 2, 2004, printed from http://www.internet.com/icom_cgi/print/print/cgi?url=http://www.15seconds.com/issue/040202.htm, 16 pages.

Baird et al., "Human Interactive Proofs and Document Image Analysis," Proceedings of the 5th IAPR International Workshop on Document Analysis Systems, Aug. 2002, 7 pages, Princeton, NJ, U.S.A.

Yuan et al., "Web Spoofing 2001," Dartmouth Technical Report TR2001-409, Department of Computer Science, Dartmouth College, Hanover, New Hampshire, Jul. 2001, 16 pages, U.S.A.

Ye et al., "Web Spoofing Revisited: SSL and Beyond," Dartmouth Technical Report TR2002-417, Department of Computer Science, Dartmouth College, Hanover, New Hampshire, Feb. 1, 2002, 15 pages, U.S.A.

Ramakrishna, "IPNL: A NAT-extended internet architecture," Proceedings of the 2001 Conference on Applications, technologies, Architectures, and Protocols for Computer Communications, 2001, pp. 69-80, ACM Press, New York, U.S.A.

* cited by examiner

FIG. 4

Choose Two Pictures to Help Recognize Spoofing

Before you sign in at participating sites, the authentication system will show you the two pictures you choose below.

No matter how genuine the site looks, if you don't see your pictures: don't sign in, don't click links, and don't follow any instructions.

Instead, type the URL of the authentication system in the Address bar of your browser and visit the Security Center for help.

Click the arrows to choose two pictures:

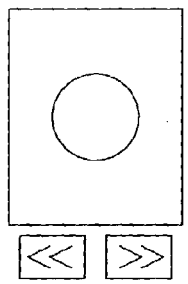 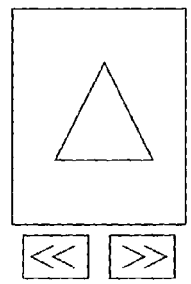

Continue  Cancel

FIG. 7

| Sign in | |
|---|---|
| E-mail Address | |
| Password | |
| | Forgot your password? |

△  ◇

○ Sign me in automatically
○ I'm using a public computer.
◉ Neither

I want to view or change my account.   [Sign In]

AUTHENTICATION OF A SERVER BY A CLIENT TO PREVENT FRAUDULENT USER INTERFACES

TECHNICAL FIELD

The present invention relates to the field of authentication. In particular, this invention relates to authentication of a server by a client to prevent fraudulent user interfaces.

BACKGROUND OF THE INVENTION

Web sites such as Internet sites often provide information, products, services, and the like to their users. Many web sites require users to register before their web servers will grant access to the users. During registration, a user typically supplies personal information such as a username, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via electronic mail) to announce, for example, special promotions, new products, or new web site features. Additionally, web sites often collect user information so web site operators can better target future marketing activities or adjust the content provided by the sites.

When registering a user for the first time, a web site typically requests that the user select a login identifier, or login ID, and an associated password. The login ID allows the web site to identify the user and retrieve information about the user during subsequent user visits to the web site. Generally, the login ID must be unique to the web site such that no two users have the same login ID. The combination of the login ID and password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

If the user visits several different web sites, each web site may require entry of similar registration information about the user, such as the user's name, mailing address, and e-mail address. This repeated entry of identical data is tedious when visiting multiple web sites in a short period of time. Many web sites require the user to register before accessing any information provided on the site. Thus, the user must first enter the requested registration information before he or she can determine whether the site contains any information of interest.

After registering with multiple web sites, the user must remember the specific login ID and password used with each web site or other network service. Without the correct login ID and password, the user must re-enter the registration information. A particular user is likely to have different login IDs and associated passwords on different web sites. For example, a user named Bob Smith may select "smith" as his login ID for a particular site. If the site already has a user with a login ID of "smith" or requires a login ID of at least six characters, then the user must select a different login ID. After registering at numerous web sites, Bob Smith may have a collection of different login IDs such as: smith, smith1, bsmith, smithb, bobsmith, bob_smith, and smithbob. Further, different passwords may be associated with different login IDs due to differing password requirements of the different web sites (e.g., password length requirements or a requirement that each password include at least one numeric character and/or at least one uppercase character). Thus, Bob Smith must maintain a list of web sites, login IDs, and associated passwords for all sites that he visits regularly.

Although presently available multi-site user authentication systems permit a web user to maintain a single login ID (and associated password) for accessing multiple, affiliated web servers or services, further improvements are desired. When a user on a client computer communicates with server such as a web site via, for example, a hypertext transfer protocol (HTTP), there is often a need to share authentication information between the client and the server. Transactional communications between a client computer and a server computer are at risk of interception by a third party. For example, there is a risk of a spoofing attack. A spoofing attack is an attack that attempts to con one or more users into making security decisions based on a misleading context. This is often in the form of a single web page interface, but can be as involved as an entire website (or several websites). This type of attack is especially dangerous because the user is lulled into a false sense of security into a context that is completely controlled by an attacker. The goal for an attacker can range from communicating misleading information to compromising security credentials and other personal information from users. There have been high profile attacks against existing web sites in which user profile data and financial information have been compromised.

Web spoofing poses a threat to both businesses and end users as authentication through web pages becomes more pervasive. Authentication systems play a critical role in enabling products and services. Web spoofing attacks designed to capture credentials not only compromise individual user accounts, but also compromise the security of the entire authentication system. In particular, in a single sign-in authentication service, compromise of user credentials results in compromise of credentials at nearly all affiliates simultaneously. Users have been educated to expect to see authentication system login pages at increasing locations (e.g., inline sign-in) and to type their password when prompted; therefore, a new unexpected location (e.g., a spoofed location) is not surprising to the user. Any web spoofing attack on an authentication service decreases the trustworthiness of the authentication service. There is a need for tools to help users defend themselves against this kind of attack.

Spoofing affects both client applications and the web. Spoofing a client application requires getting code to run on a user's machine that has been compromised. There have been no viable solutions in present systems to client application spoofing because any solution has to distrust programs running on a user's machine. Conversely, with web spoofing, no compromise of the user's machine is necessary. However, to enable a trust scenario between the user and the login page, the user needs to be able to authenticate the authentication server or other service before the user discloses sensitive information.

Existing systems primarily focus on user education as the key to combating web spoofs. While an informed user base is beneficial, education alone is not sufficient to prevent web spoofing. In such existing systems, users have been instructed that reading the address bar in the browser or verifying a secure sockets layer (SSL) certificate is enough to verify the identify of a website. However, these tools have been shown to be ineffective at solving the web spoofing problem. For example, an attacker can spoof the web browser itself and show a spoofed address bar, status bar (including SSL lock icon) as well as the SSL dialog. That is, a user reading the address bar and the SSL certificate can still be easily spoofed by an attacker.

Another existing system to prevent web spoofing includes assigning colors to browser windows or frames and informing the user in one window of the expected color of another window. However, such a system requires modifications to the browser software and is not customizable by the user. Similarly, other existing systems for the prevention of web spoofing involve client downloads. However, a majority of users have ignored such systems by failing to download the software modifications. There is a need for a web spoofing solution for users who use a dumb client (e.g., web browser) and will not download additional software. The problem of web spoofing remains given that user education is not enough and that users will not download client software.

For these reasons, a system for authentication of a server by a client to prevent fraudulent user interfaces is desired to address one or more of these and other disadvantages.

SUMMARY OF THE INVENTION

The invention includes authentication of a server by a client to prevent fraudulent user interfaces. In particular, the invention includes a web-based solution to protect a user against web spoofing in which the user confirms the authenticity of a web page prior to submitting sensitive information such as user credentials (e.g., a login name and password) via the web page. In operation, the web page provides the user with a token or other identifiable piece of information representing a shared secret between the user and the server. The user confirms the correctness of the shared secret to ensure the legitimacy of the web page prior to disclosing any sensitive information. According to one embodiment of the invention, the invention allows the user to authenticate the web page before disclosing credential information for use in authenticating the user. For example, the shared secret may be an image located in close proximity to a field for entering the credential information in the web page.

The invention enables users to make better trust decisions to reduce the risk of a web spoofing attack before disclosing credential and personal information. The invention is user-friendly and compatible with existing web browsers. Clients interact with the server according to the invention without modification to the client and without software downloads. Further, the invention may be applied to any web page in a web site with minimal effort.

In accordance with one aspect of the invention, a method establishes a shared secret for use during authentication between a client and a server. The client and server are coupled to a data communication network. The method includes receiving, at the server, a request from the client to establish the shared secret. The method also includes provisioning an authentication token as the shared secret to the client in response to the received request. The method also includes delivering, to the client for storage, configuration data identifying the provisioned authentication token.

In accordance with another aspect of the invention, a method provides authentication between a client and a server using a shared secret. The client and server are coupled to a data communication network. The method includes receiving, at the server, a request from the client for content. The request includes configuration data associated with an authentication token. The method also includes obtaining, in response to the received request, the authentication token associated with the received configuration data from a memory area accessible to the server. The method also includes delivering the requested content to the client with the obtained authentication token as the shared secret.

In accordance with yet another aspect of the invention, one or more computer-readable media have computer-executable components for authentication between a client and a server using a shared secret. The client and server are coupled to a data communication network. The components include a network component for receiving, at the server via the data communication network, a request from the client for content. The request includes configuration data that is associated with an authentication token. The components also include a shared secret component for obtaining, in response to the request received by the network component, the authentication token associated with the received configuration data from a memory area accessible to the server. The components also include a user interface component for delivering the requested content to the client with the authentication token as the shared secret obtained by the shared secret component.

In accordance with still another aspect of the invention, a computer-readable medium stores a data structure representing an association between configuration data and an authentication token representing a shared secret between a client and a server. The client and server are connected to a data communication network. The data structure includes a first field storing configuration data. The data structure also includes a second field identifying an authentication token associated with the configuration data stored in the first field. The server delivers content with the authentication token to the client prior to receiving a credential from the client via the delivered content.

In accordance with another aspect of the invention, a system provides authentication between a client and a server using a shared secret. The client and server are coupled to a data communication network. The system includes a database accessible to the server. The database stores a record having a first field storing configuration data and a second field identifying an authentication token associated with the configuration data stored in the first field. The system also includes a processor associated with the server. The processor executes computer-executable instructions to perform:

receiving, at the server, a request from the client for content, the request including the configuration data;

obtaining, from the database, the authentication token associated with the received configuration data in response to the received request; and delivering the requested content to the client with the obtained authentication token as the shared secret, the requested content including a field for receiving a credential from the client.

Alternatively, the invention may comprise various other methods and apparatuses.

Other features will be in part apparent and in part pointed out hereinafter.

BRIEF DESCRIPTION OF THE DRAWINGS

FIG. 4 is a screen shot of an exemplary user interface for establishing a shared secret.

FIG. 7 is a screen shot of an exemplary user interface for authentication of the server by the user.

Corresponding reference characters indicate corresponding parts throughout the drawings.

DETAILED DESCRIPTION OF THE INVENTION

According to one embodiment, the invention includes authentication of a server by a client using a secret shared between the server and the client to prevent fraudulent user interfaces. The shared secret includes a token or other identifiable piece of data such as one or more of the following: an image, a sound, text, and a color. The invention includes software to establish the shared secret (see FIG. 4) and subsequently deliver the shared secret to the client for display in the user interface (see FIG. 7) for the user to determine the legitimacy of the user interface prior to submitting sensitive information via the user interface. Unlike a Turing test in which the server randomly quizzes the user, the invention allows the user to authenticate the server via a user customizable security or authentication token.

To authenticate the server, the user perceives identifiable information known only to the server and to the user. The identifiable information includes any data distinctly recognizable by the user. The identifiable information acts as the security token representative of the shared secret between the server and the user. In one embodiment, the server provisions a set of two pictures during registration to act as the security token. The server may assign the token or allow user customization of the token. In operation, the server delivers the two provisioned images to the user for display in the user interface. The user analyzes the legitimacy of the user interface by determining if the two delivered images correspond to the provisioned security token.

In one aspect, the invention prevents attackers from spoofing web login interfaces as well as web pages that prompt the user to disclose sensitive information such as a credential. Such web pages may provide the user with an option to reset a password, change a password, or update a profile. For example, a man-in-the-middle spoofing attack includes an attacker spoofing a login page, receiving credentials (e.g., a login name) from the user via the spoofed login page, and communicating with an authentication system using the received credentials to authenticate the user. In one embodiment of the invention, the user only provides a user identifier to the web site before determining the authenticity of the web site.

Those skilled in the art will appreciate that spoofing attacks are not limited to the specific attacks described herein. It is contemplated by the inventors that the invention helps to prevent any form of spoofing. Further, the invention may be applied to any user interface including web pages and web forms.

Exemplary Network Environment

Figure 1:
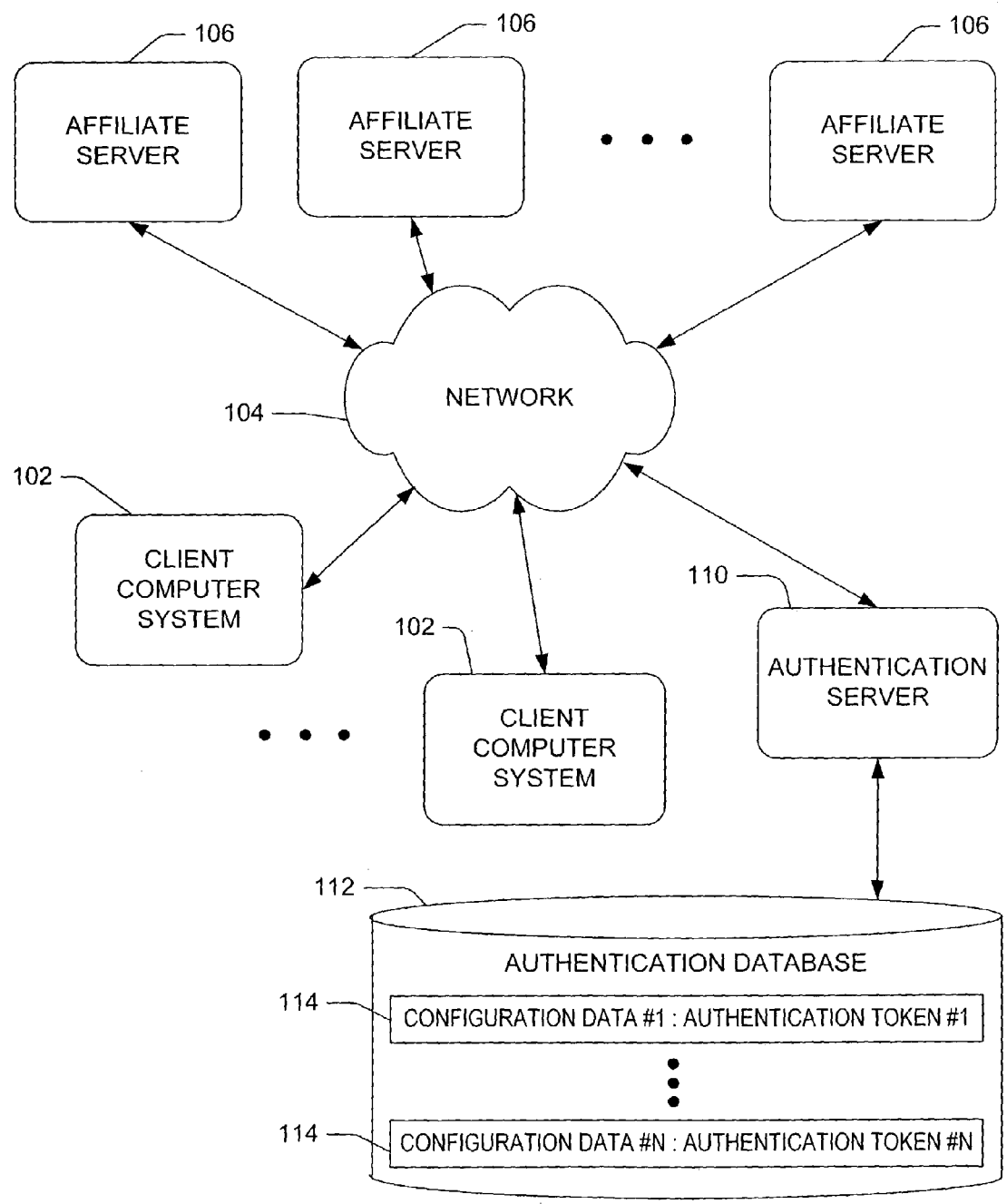
FIG. 1 is a block diagram illustrating one example of a suitable network environment in which the invention may be implemented.

Referring now to the drawings, FIG. 1 illustrates an exemplary network environment in which the present invention is utilized. The invention relates to cross-network collaboration between web sites as part of a distributed, multi-site user authentication system. Such services provide a user with the ability to access one or more participating web sites or resources with a single sign-in. Although the participating, or affiliate, sites still maintain control over permissions, they use the authentication service rather than hosting and maintaining their own proprietary authentication systems. Those skilled in the art will note that although the invention is described in terms of a multi-site user authentication system, it is contemplated by the inventors that the invention is operable with any type and number of authentication systems.

In FIG. 1, one or more client computer systems 102 are coupled to a data communication network 104. In this example, the network 104 is the Internet (e.g., supporting the World Wide Web). However, the teachings of the present invention can be applied to any data communication network. Multiple affiliate servers 106 are also coupled to network 104. In turn, the client computer systems 102 can access the affiliate servers 106 via network 104. Affiliate servers 106 are also referred to as web servers or network servers.

An authentication server 110 having at least one processor is coupled to network 104, which allows communication between the authentication server 110 and client computer systems 102 and web servers 106. Although referred to as an authentication server, authentication server 110 in the illustrated embodiment is also a web server capable of interacting with web browsers and other web servers. In this example, authentication server 110, client computer systems 102, and web servers 106 communicate data among themselves using the hypertext transfer protocol (HTTP), a protocol commonly used on the Internet to exchange information. An authentication database 112 is coupled to authentication server 110. The authentication database 112 contains information (e.g., credentials) necessary to authenticate a user of one of the client computer systems 102 (as well as other users on the network) and also identifies which elements of the user profile information should be provided to a particular affiliate server 106 when the user accesses the affiliate server. In general, a credential includes a means for generating an authenticated reference to a single account identifier. For example, an EASI sign-in name and password, a mobile phone number and a personal identification number (PIN), and a biometric signature are all credentials that can be associated with the same profile data. In addition, authentication database 112 includes a data structure 114 for each user storing configuration data and an authentication token associated with the configuration data.

Although authentication database 112 is shown separately from authentication server 110, it is to be understood that in other embodiments of the invention, authentication database 112 may be contained within authentication server 110. In a federated environment, for example, a plurality of authentication servers 110 may be used to provide authentication. Further, it is to be understood that authentication server 110 and authentication database 112 may be contained with affiliate server 106.

The authentication server 110, as described herein, authenticates a user of client computer 102 seeking access to a particular one of the affiliate servers 106. Authentication server 110 first requests authenticating login information from the user, such as the user's login ID and password. If the user is successfully authenticated, authentication server 110 routes the user's client computer 102 to the appropriate affiliate server 106 for performing a desired service for the user.

As part of the user authentication process, authentication server 110 may provide certain user profile information to affiliate server 106, such as the user's e-mail address, user preferences, and the type of Internet browser installed on client computer 102. This user profile information is associated with the user's login ID so that each time the user logs into a particular affiliate server 106, the associated user profile information is available to the affiliate server. This user profile allows the user to enter the information once and use that same information during subsequent logins to new affiliate servers. By maintaining user profile information, the authentication system of the invention is able to share pertinent information with the affiliate sites to speed registration and enable access to personalized accounts or services.

In one embodiment, an affiliate server registers or otherwise establishes a relationship or affiliation with authentication server 110. Each affiliate server 106 includes a code sequence (not shown) that allows the affiliate server to communicate with authentication server 110 when a user (who is also registered with authentication server 110) requests access to affiliate server 106.

Prior to executing the authentication process, both the user of client computer system 102 and the operator(s) of affiliate servers 106 register with authentication server 110. This registration is a one-time process that provides necessary information to the authentication server. The user of client computer system 102 registers with authentication server 110 by providing information about the user and/or client computer system 102, such as, the user's name, mailing address, and e-mail address. As part of the user registration process, the user is assigned (or selects) a login ID, which is a common login ID, used to access any affiliate server (e.g., server 106). The login ID may also be referred to herein as a username, member name, or login name. As described above, multi-site user authentication systems of the type described herein permit the user to establish a unique account identified by an e-mail address. An EASI (E-mail As Sign-In) account allows the user to use an existing e-mail address as a login ID, or sign-in name (e.g., Jane@pageA.net) while supplying all the other attributes used to create an account.

Additionally, the user selects a password associated with the login ID that is used for authentication purposes. After registering and logging into authentication server 110, the user can visit any affiliate server 106 (i.e., affiliate servers that are also registered with the same authentication server) without requiring any additional authentication and without re-entering user information that is already contained in the associated user profile. The present invention sets forth identifying the user account, or profile, by a unique account identifier.

The operator(s) of affiliate servers 106 register with authentication server 110 by providing information about the affiliate server (e.g., server name and network address). Additionally, each affiliate server 106 provides information regarding its authentication requirements. The requirements for authentication may be specified in terms of a maximum time allowed since the last login and entry of authentication information by the user. These requirements may also be specified by the maximum time allowed since the last "refresh" of the authentication information by the user. After registering with authentication server 110, affiliate servers 106 can use the authentication server to authenticate any user that has also registered with the authentication server.

In one embodiment, authentication database 112 includes a computer-readable medium storing the data structure 114 representing an association between configuration data and an authentication token representing the shared secret. In the example of FIG. 1, a separate data structure 114 exists for each of N users. However, those skilled in the art will note that authentication database 112 may store the configuration data and authentication tokens in any format (e.g., in a relational database). Each data structure 114 includes a first field storing configuration data and a second field identifying an authentication token associated with the configuration data stored in the first field. In one embodiment, the configuration data includes a file name and/or a cookie identifying the authentication token. Alternatively, the configuration data includes a user identifier or client identifier associated with one of the authentication tokens.

In addition, authentication server 110 has access to a repository of available security tokens (e.g., a pool of images). For example, the tokens may be stored as files in authentication database 112. As the server and client are coupled to a data communication network, a message containing one or more of the tokens is sent over the network (see FIG. 5). In one embodiment, the message is sent using a security mechanism such as secure hypertext transfer protocol (HTTPS) or secure sockets layer (SSL). With HTTP, the size of such a message is not hidden. To prevent an attacker with a stolen copy of all available tokens from guessing which token(s) are in the message based on the size of message, each of the tokens in authentication database 112 may be stored in a file conforming to a predetermined data size (e.g., file size). For example, each file may be padded by the invention software to a predetermined data size either in authentication database 110 or immediately prior to delivery to the client. Alternatively or in addition, the invention software may compress each file to a predetermined data size prior to presenting the token stored in the file to the client. In yet another embodiment, the invention software may fill an ETag HTTP header field with a bogus string to pad the size of the message.

Establishing a Shared Secret

Figure 2:
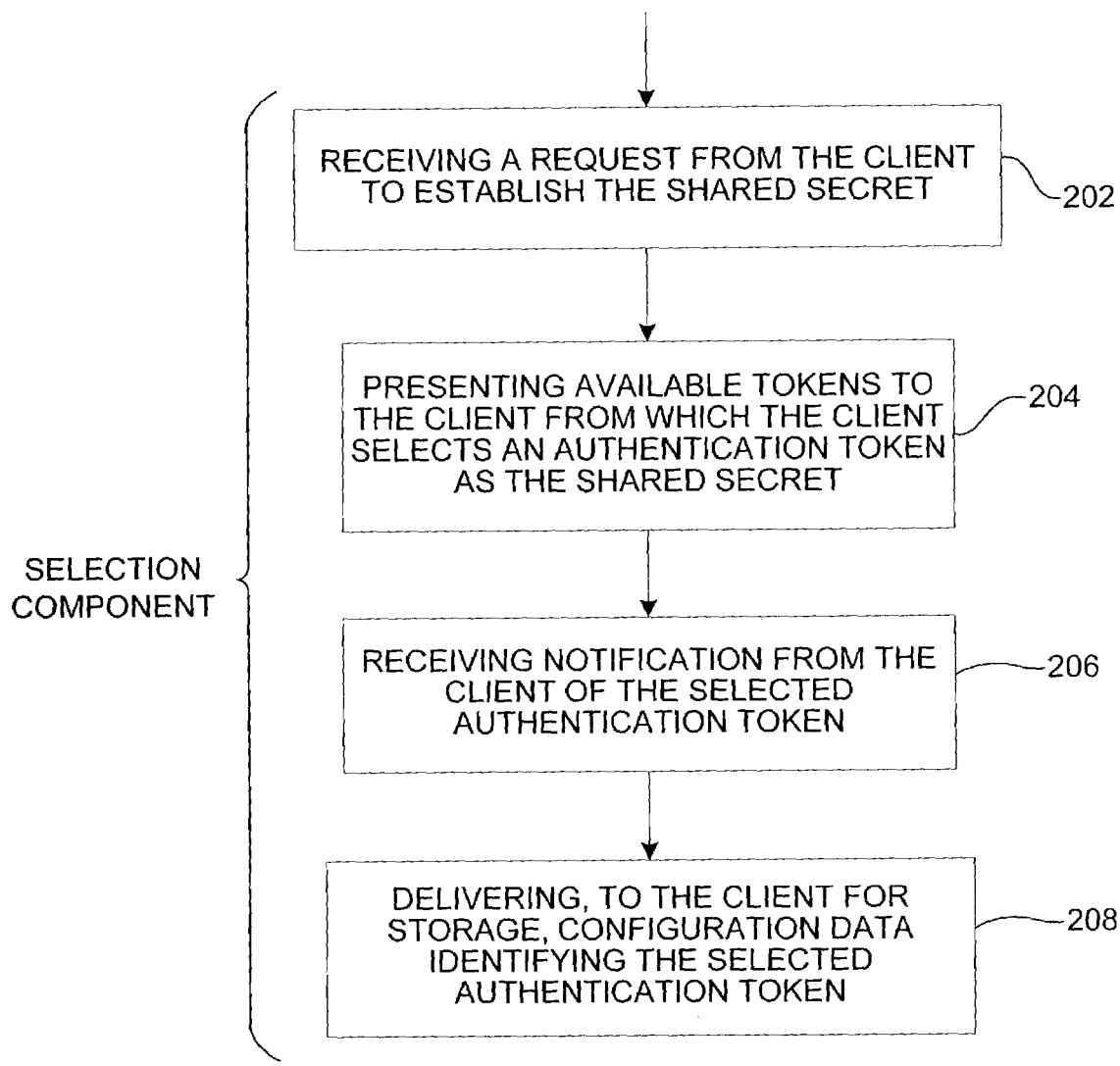
FIG. 2 is an exemplary flow chart illustrating establishment of a shared secret.

Referring next to FIG. 2, an exemplary flow chart illustrates establishment of a shared secret between a server such as affiliate server 106 and a client such as client 102. In one embodiment, one or more computer readable media have computer-executable instructions embodied in a selection component for performing the method illustrated in FIG. 2. The server, executing invention software, receives a request from the client to establish the shared secret at 202. In response to the received request, the server provisions the authentication token as the shared secret to the client. The server provisions the authentication token by selecting the authentication token from a plurality of tokens and assigning the selected token to the client. In another form, the server provisions the authentication token by presenting a plurality of tokens to the client from which the client selects an authentication token as the shared secret at 204. The server receives notification from the client of the selected authentication token at 206. After provisioning the authentication token, the server delivers, to the client for storage, configuration data identifying the provisioned authentication token at 208. For example, all or a random subset of fifty thousand tokens may represent the plurality of tokens. Further, the user may select two images as the authentication token. In such an example, the server has access to approximately 45,000 images resulting in 2,025,000,000 combinations of two images as the token. A large pool of available tokens reduces the chance that an attacker might guess the token of a particular user. The available tokens may include tokens supplied by the server or provided by the client. For example, the tokens may include photographs of the client's children or a sound clip of the client's voice. When accessing the server via a cellular telephone, for example, the user may prefer to select a sound clip as a shared secret.

In one embodiment, the server delivers the configuration data to the client by writing a secure persistent cookie via HTTP in the domain of the server that contains the user identifier along with some other information such as an encrypted random sixty-four bit number. The server maintains a mapping or association between the selected token (e.g., the two images) and the user identifier in authentication database 112. Those skilled in the art will note that the user identifier may be any identifier used to uniquely identify the user such as an alphanumeric string or an encrypted user name. The server may restrict the path of the cookie to a subdirectory off the web root to reduce exposure of the cookie.

Figure 3:
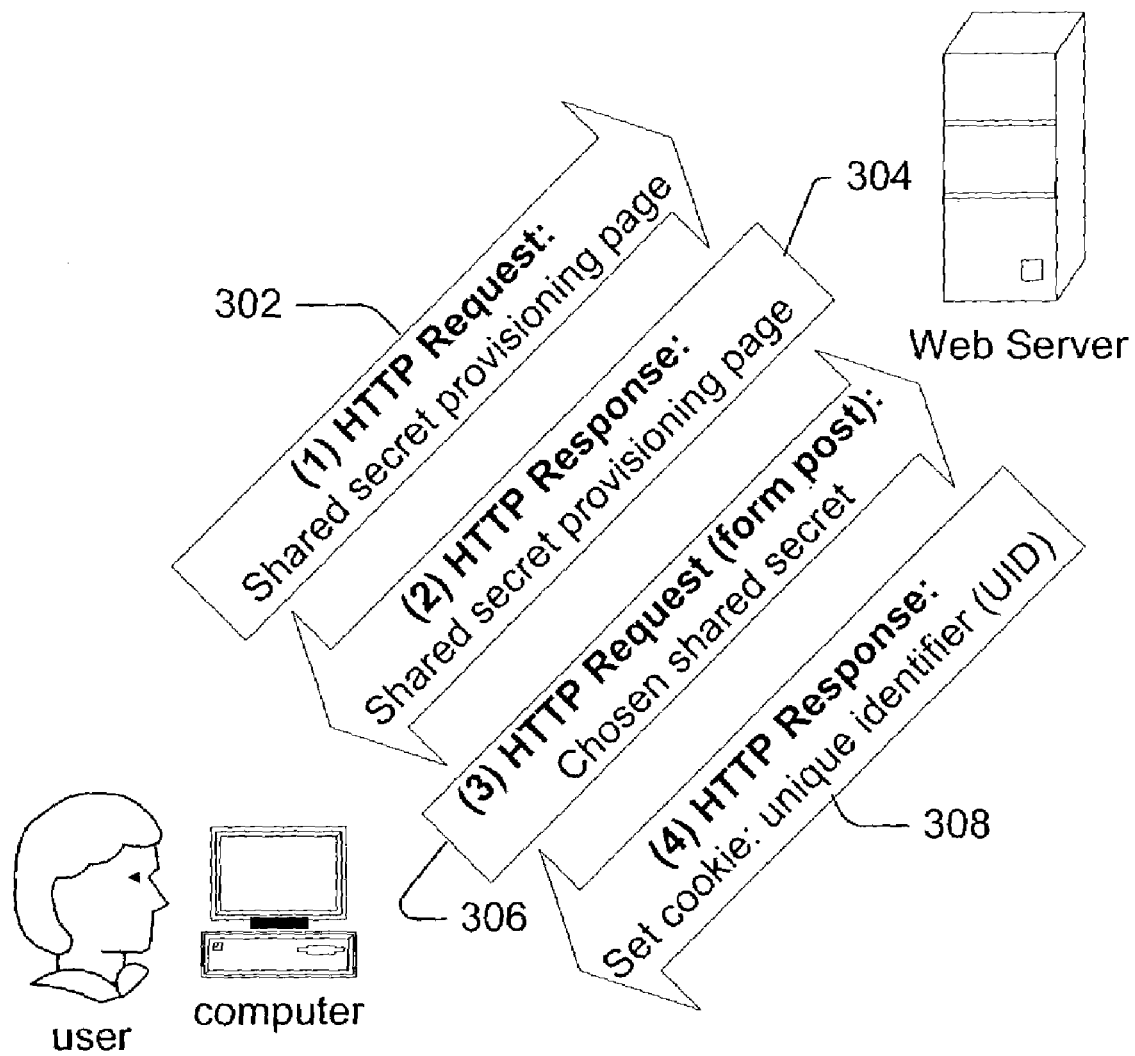
FIG. 3 is an exemplary block diagram illustrating communication between the client and the server when establishing a shared secret.

Because the server stores the configuration data on the client, the user performs the method illustrated in FIG. 2 and FIG. 3 to setup each client computer employed by the user to access the server. In an embodiment in which the configuration data includes the user identifier, any change to the shared secret via a specific client computer is reflected on all client computers with configuration data storing the same user identifier. That is, the unique user identifier remains constant while the token selected as the shared secret may be modified in authentication database 112. As such, the invention software achieves synchronization of the shared secret between all client computers storing configuration data with the user identifier associated with the modified shared secret. In an embodiment in which references to the authentication token (not using the client identifier) are stored in the configuration data, synchronization among the various client computers is not available.

To improve security, the communication between the client and the server when establishing the shared secret may occur over SSL in the data communication network. The invention software includes the ability for the client to change the provisioned token at a later time.

Referring next to FIG. 3, an exemplary block diagram illustrates communication between the client and the server when establishing the shared secret. The user, via a client computer, sends an HTTP request to the server to establish the shared secret via a shared secret provisioning web page hosted by the server at 302. In response to the request, the server delivers the shared secret provisioning web page to the client at 304. The shared secret provisioning page includes a plurality of tokens available for selection as the shared secret. The user selects one of the tokens as the shared secret, and posts the selection to the server at 306. The server updates a database storing an association between the client and the selected token. The server delivers an HTTP response to the client with configuration data identifying the selected, shared secret at 308. In the example of FIG. 3, the configuration data includes a cookie storing an identifier associated with the client and with the shared secret. The client stores the configuration data. Those skilled in the art will appreciate that variations of the flow illustrated in FIG. 2 and FIG. 3 for establishing the shared secret exist and are within the scope of the invention.

Referring next to FIG. 4, a screen shot of an exemplary user interface for establishing a shared secret illustrates the shared secret provisioning page of FIG. 3. The user interface of FIG. 4 displays two images to the client on a display from which the client selects the authentication token as the shared secret via a user interface selection device. For example, the client uses a mouse to click on the arrows to view the available images. After selecting two images, the client notifies the server of the selected images by transmitting an execution signal to the server via the user interface selection device. In FIG. 4, the user selects the "continue" button as the execution signal. In response to receiving the execution signal from the client, the server delivers to the client for storage the configuration data identifying the two selected images.

Authentication Method

Figure 5:
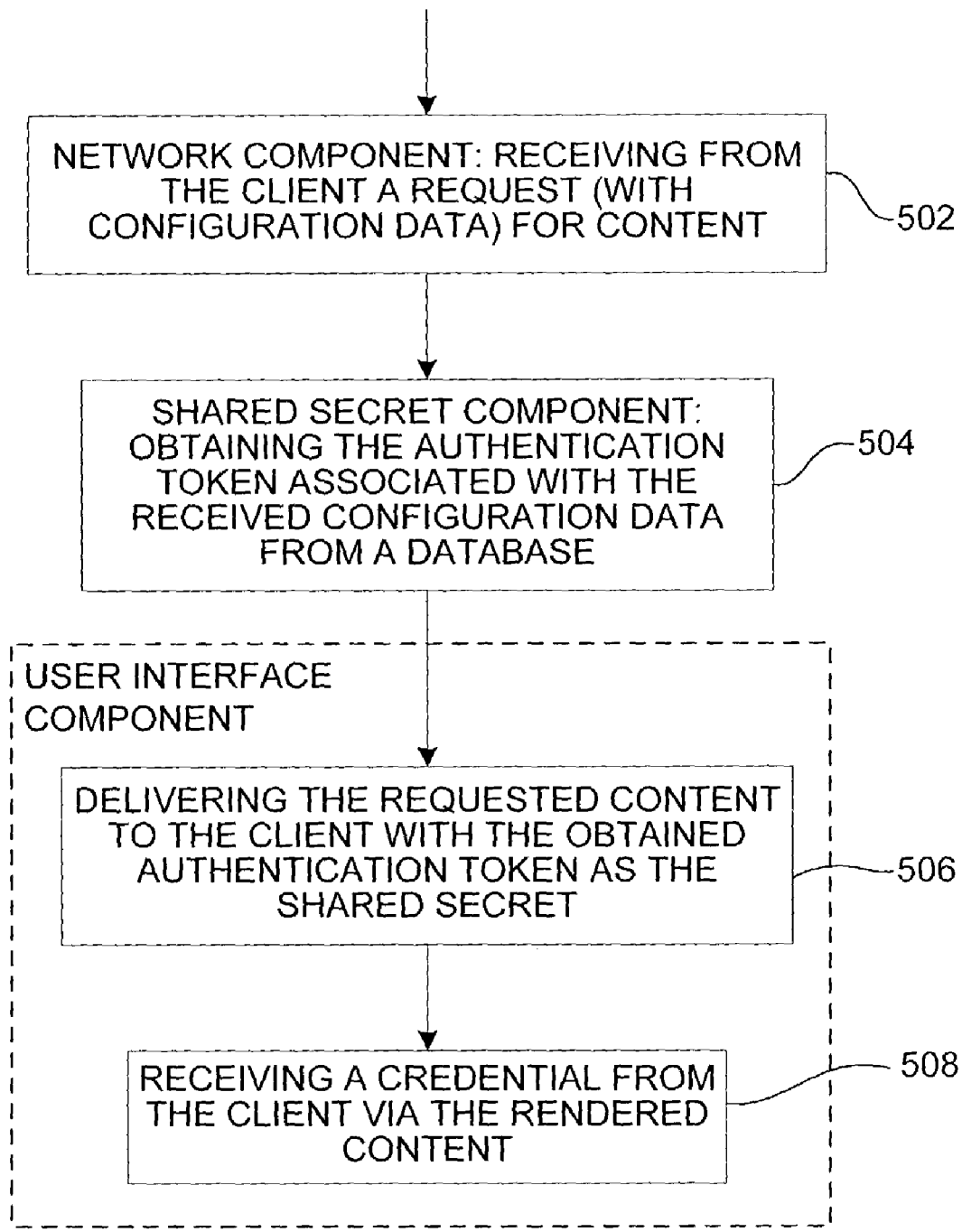
FIG. 5 is an exemplary flow chart illustrating operation of the authentication method of the invention.
Figure 6:
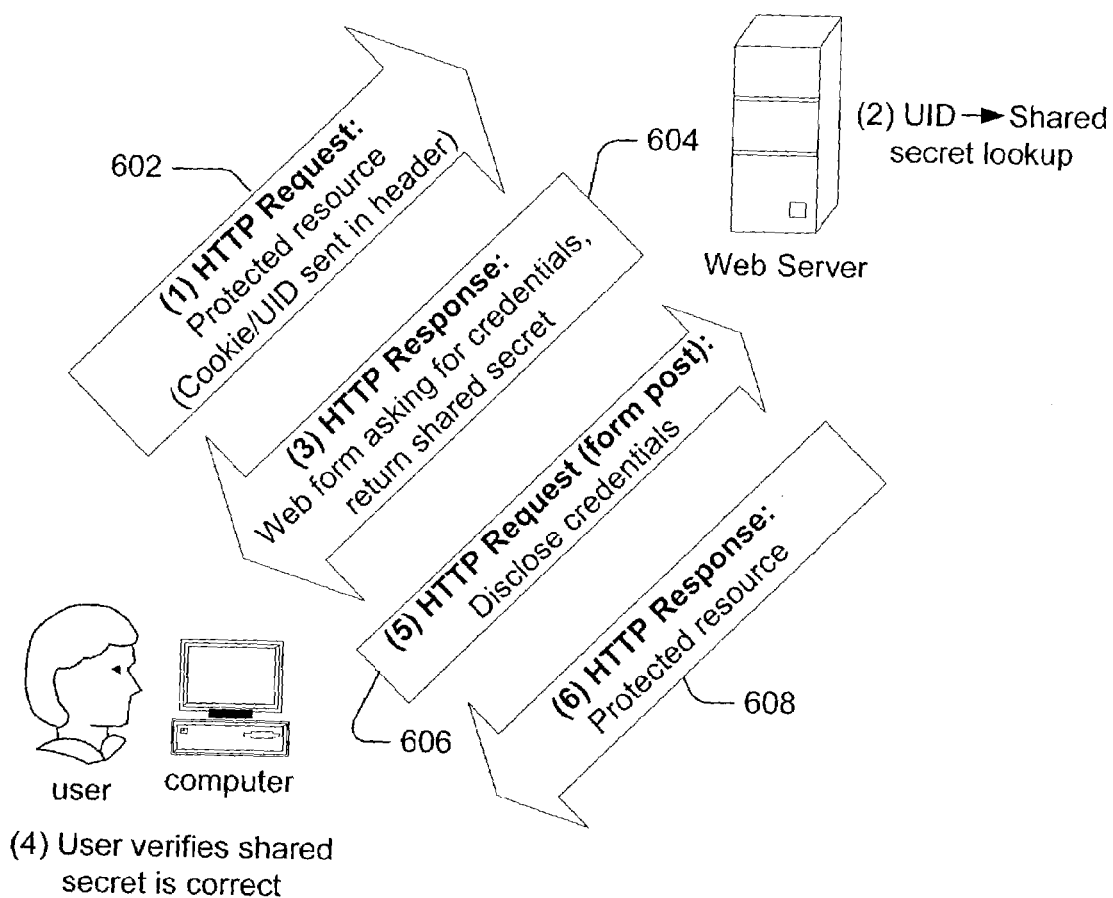
FIG. 6 is an exemplary block diagram illustrating communication between the client and the server during authentication.

Referring next to FIG. 5, an exemplary flow chart illustrates operation of the authentication method of the invention. In one embodiment, one or more computer readable media have computer-executable instructions or components for performing the method illustrated in FIG. 5. In the example of FIG. 5 and FIG. 6, the server and the client have already established a shared secret (see FIG. 2 and FIG. 3). A network component of the invention software executes on the server to receive a request from the client for content at 502. The requested content includes any data such as a login interface and/or a web form. The request includes the configuration data associated with the authentication token. The configuration data includes, for example, a user identifier or a filename identifying the authentication token. In one embodiment, the client stores the configuration data in a cookie marked as secure. Existing browsers provide cookies only to the server or web site that originally set the cookie on the client. As such, when the client requests the content from the server via an existing browser, the browser sends the cookie storing the configuration data (e.g., replays the cookie) to the server if the server (or other computing device in the domain of the server) originally set the cookie on the client. Further, the cookie is set and replayed over SSL. In this manner, an attacker spoofing the server is prevented from capturing the configuration data to perform a man-in-the-middle attack using the captured configuration data. It is contemplated by the inventors that the invention is not limited to existing browsers, cookie functionality, or secure protocols and that other methods of preventing unauthorized servers from obtaining the configuration data exist and are within the scope of the invention.

In response to the received request, a shared secret component of the invention software executes on the server to obtain the authentication token associated with the received configuration data from a memory area accessible to the server at 504. In one form, the shared secret component obtains the authentication token by indexing, via the received configuration data, into a database storing the authentication token. The server modifies the requested content to include the obtained authentication token. A user interface component of the invention software executes on the server to deliver the requested content to the client with the obtained authentication token as the shared secret at 506. In one embodiment, the server delivers the requested content to the client as a hypertext markup language (HTML) document to the client only if the document is unframed by the client. The user interface component further receives a credential from the client via the displayed content at 508. The received credential includes, but is not limited to, one or more of the following: a login name, a password, and an electronic mail address.

For example, on visits to the server after the shared secret has been provisioned, the client sends the configuration data to the server as a cookie in the headers of the HTTP request for content such as a web page. The user identifier in the configuration data in the cookie allows the server to perform a lookup for the shared secret using the user identifier and to return the shared secret with the HTTP response. For example, if the shared secret includes two images, the server modifies the requested web page to include the two images and then delivers the requested web page to the client.

Referring next to FIG. 6, an exemplary block diagram shows an interaction flow between the client and the server in which the user is able to authenticate the server before disclosing their credentials. The user, via the client computer, sends an HTTP request to the server for content such as a protected resource at 602. A cookie containing the user identifier is included in the headers of the HTTP request. The server obtains the shared secret (e.g., the authentication token) associated with the received user identifier from a database such as authentication database 112. The server delivers a web form with the obtained shared secret to the client computer at 604. In one embodiment, the server delivers the web form over SSL to prevent a third party from intercepting the data stream between the client and the server. The client computer renders (e.g., displays) the delivered web form and shared secret for the user to analyze the rendered shared secret. If the rendered shared secret does not match the provisioned shared secret, the user is immediately aware that the web form has been spoofed. The user then knows to not submit any sensitive information to the spoofed web form.

If the rendered shared secret matches the provisioned shared secret, the user submits credentials in an HTTP request (e.g., a form post) from the rendered web form at 606. The server receives the credentials and authenticates the user based on the received credentials. If authentication is successful, the server delivers the protected resource to the client at 608. If authentication is unsuccessful, the server generates an error response. For example, the server may deliver an error message to the client computer and re-deliver the web form asking for credentials. Those skilled in the art will appreciate that variations of the flow illustrated in FIG. 5 and FIG. 6 for obtaining and delivering the shared secret to the client exist and are within the scope of the invention.

Referring next to FIG. 7, a screen shot of an exemplary user interface for authentication of the server by the user illustrates the web form described in FIG. 6. The user interface of FIG. 7 displays the web form asking for credentials of the user. In particular, the web form includes entries for an email address and a password of the user. In addition, the user interface displays two images as the shared secret for the user to review and determine if the displayed images match the images previously provisioned as the shared secret. The user enters an email address and password into the web form entries and selects the sign-in button on the user interface to post the credentials to the server only if the displayed images match the provisioned images.

Implementation

Those skilled in the art will note that the invention may be implemented in various ways alone and in combination with other spoof-prevention tactics. It is contemplated by the inventors that all such implementations are within the scope of the invention.

In one embodiment in which the authentication token is delivered as part of a login page (see FIG. 7), the server delivers the login page to the client in an inline frame ("iframe"). An iframe includes embedding the login page in web pages hosted by servers such as affiliate server 106. To prevent the spoof recognition iframe from being hosted on a web page of an attacker, an HTTP referrer check may be performed. The server maintains a list of valid referrers that are allowed to host the iframe.

Inline framing may be implemented in any web page asking for a credential or other sensitive information. The server references the iframe with the login page in any web page hosted by the server. Further, inline framing allows modularity by standardizing and outsourcing the display of the login page (and authentication token) across all servers. Also, changes to the display of the login page are applied to all web pages hosted by the servers. An example of an iframe using HTML code is shown below.

<body>
<IFRAME=loginpage.htm>

In the above example, the web page loginpage.htm represents the inline framed login page.

Additionally, by using an iframe, the server stores the authentication tokens in a subdirectory off the web root of the server (e.g., login.pageA.net/tokendirectory). Such storage limits exposure of the cookie storing the configuration data because the cookie's path will be restricted. That is, the cookie will only be sent across the data communication network during a request to the subdirectory off the web root.

If inline sign-in is not available, then the invention performs a referrer check to ensure that the referrer is in the domain of the authentication system. If inline sign-in is available, then pages outside of the authentication system may host the login page. In this case, the invention maintains a list of valid referrers who include the login page of partners of the authentication system.

In another embodiment, the server identifies the spoof recognition images in the iframe with constant filenames. For example, the server identifies three images as the authentication token with the following URLs.

http://login.pageA.net/spoof/a.jpg
http://login.pageA.net/spoof/b.jpg
http://login.pageA.net/spoof/c.jpg The invention software executing on the server reads the spoof recognition cookie with the user identifier and returns the three images provisioned as the shared secret corresponding to the user identifier as a.jpg, b.jpg, and c.jpg. Constant file names allow the HTML code describing the login page to be static and driven by the server to return the correct authentication token. That is, specific references to the images representing the authentication token do not need to be inserted manually in the login page each time the login page is delivered to the client.

In an alternative embodiment using dynamic filenames for the authentication token, the invention software executing on the server dynamically modifies the login page based on the shared secret provisioned for the client requesting the login page. The server reads the cookie with the user identifier and modifies the source code for the login page to include specific references to the authentication token associated with the user identifier. The server then delivers the modified login page to the client. For example, the invention dynamically generates the HTML source code and provides IMG SRC tags that directly reference the filenames for the images (e.g., http://login.pageA.net/spoof/151.jpg).

An alternative man-in-the-middle attack may involve framing the login page from the server and using DIV tags or DHTML to obfuscate portions of the displayed login page. An attacker can place content around the login page to allow the proper authentication token to be rendered yet still compromise credentials (e.g., fake entries for the email address and password). To prevent this form of attack, the login page includes a script (e.g., JAVASCRIPT) that checks whether the login page is being framed (e.g., top.window==window). If the login page is being framed, the script either refuses to render the authentication token or removes framing (e.g., top.window.location=window.location).

Typically, if security measures require client script to be run, it can easily be defeated by either disabling browser's client scripting or by putting the content in a restricted iframe. Only the latter case is applicable here since protecting changes to the user's browser is out of scope.

Exemplary Operating Environment

Figure 8:
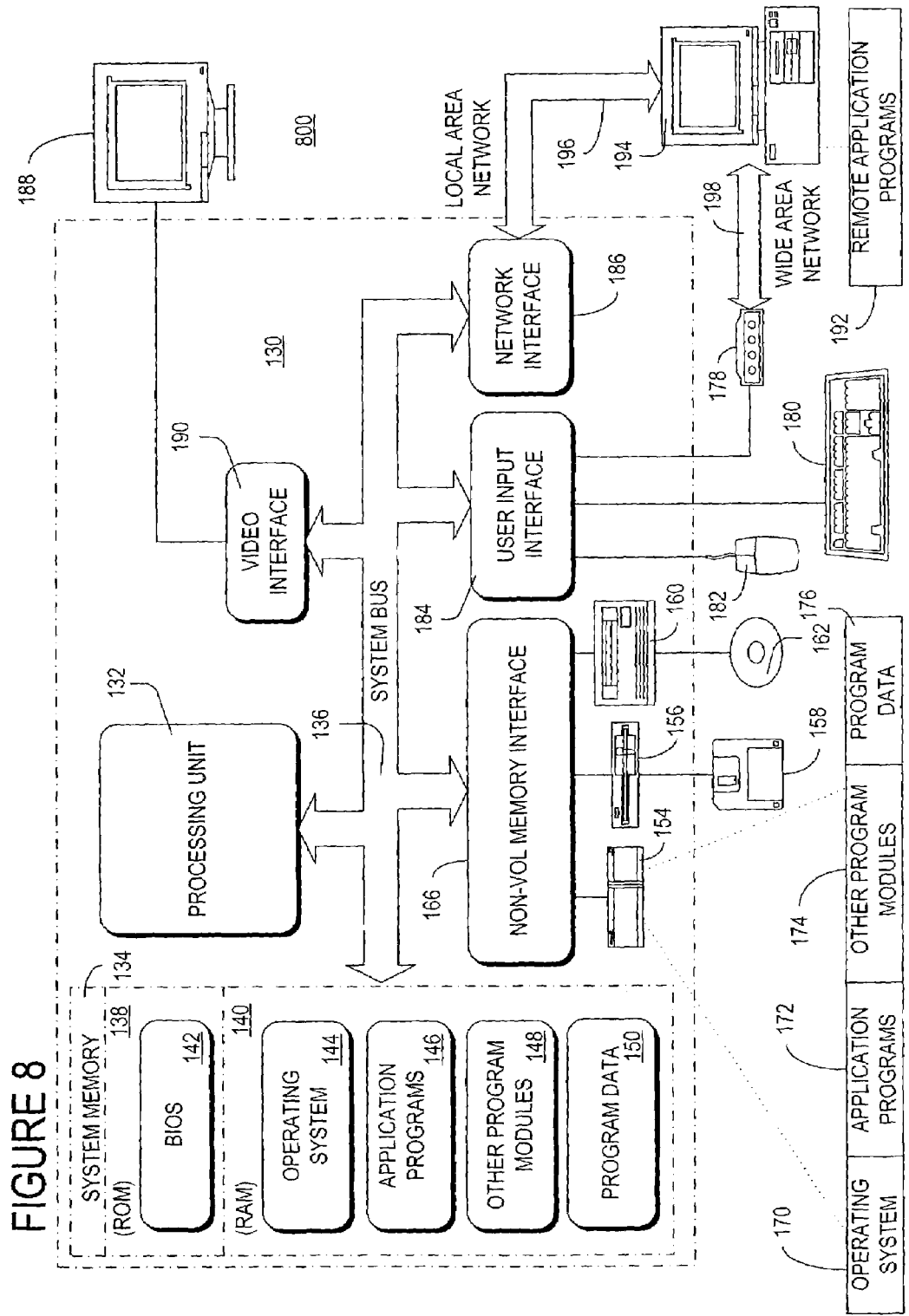
FIG. 8 is a block diagram illustrating one example of a suitable computing system environment in which the invention may be implemented.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in an y method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display or display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment 800, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions or components such as those illustrated in FIG. 2 to establish a shared secret between the client and the server. Similarly, computer 130 executes computer-executable instructions or components such as those illustrated in FIG. 5 to allow the client to authenticate the server prior to the client submitting sensitive credentials to the server.

Further, the system of the invention includes a database such as program data 176 accessible to the server. The database stores a record having a first field storing the configuration data and a second field identifying the authentication token associated with the configuration data stored in the first field. A processor such as processing unit 132 associated with the server executes computer-executable instructions to:

receive a request with configuration data from the client for content;

obtain, from the database, the authentication token associated with the received configuration data in response to the received request; and deliver the requested content to the client with the obtained authentication token as the shared secret. The requested content includes a field for receiving a credential from the client. According to one embodiment of the invention, the record stores the user identifier in the first field and a filename for each of two images in the second field.

Web Addresses

Information in this document, including network addresses such as uniform resource locators and Internet web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of establishing a shared secret for use during authentication between a client and an authentication server, said client and authentication server being coupled to a data communication network, the method comprising:

receiving, at the authentication server, a first request from the client to establish the shared secret, said client being accessed by a user at the client;

provisioning an authentication token as the shared secret to the client in response to the received first request, said provisioned authentication token for use by the user accessing the client to authenticate the authentication server;

delivering, to the client for storage, configuration data identifying the provisioned authentication token;

receiving, at the authentication server via a second server, a second request from the client for content, said second request comprising the configuration data;

comparing an address of the second server to a list of valid referrers;

obtaining, from a memory area accessible to the authentication server, the authentication token associated with the received configuration data in response to determining that the second server is on the list of valid referrers; and delivering the requested content and the obtained authentication token as the shared secret to the client via a frame of a web page of the second server in response to determining the second server to be on the list of valid referrers.

2. The method of claim 1, wherein provisioning the authentication token comprises selecting an authentication token from a plurality of tokens.

3. The method of claim 1, wherein provisioning the authentication token comprises:
presenting, in response to the received first request, a plurality of tokens to the client from which the client selects an authentication token as the shared secret; and
receiving notification from the client of the selected authentication token.

4. The method of claim 3, wherein the plurality of tokens comprises a plurality of images, and wherein presenting comprises delivering the plurality of tokens to the client from which the user accessing the client selects two images from the plurality of images as the shared secret.

5. The method of claim 3, wherein the plurality of tokens comprises approximately fifty thousand tokens.

6. The method of claim 3, wherein the plurality of tokens comprises a randomly-generated subset of available tokens.

7. The method of claim 3, wherein each of the tokens is stored in a file conforming to a predetermined data size.

8. The method of claim 3, wherein each of the tokens is stored in a file, and further comprising padding the file to a predetermined data size prior to presenting the plurality of tokens to the client.

9. The method of claim 3, wherein each of the tokens is stored in a file, and further comprising compressing the file to a predetermined data size prior to presenting the plurality of tokens to the client.

10. The method of claim 1, wherein the configuration data comprises a cookie.

11. The method of claim 1, wherein the configuration data identifies the provisioned authentication token.

12. The method of claim 1, wherein the configuration data includes a user identifier, said user identifier associated with the provisioned authentication token.

13. The method of claim 1, wherein the authentication token comprises one or more of the following: a sound, text, a color, and an image.

14. The method of claim 1, wherein the receiving and the delivering occur over a secure sockets layer (SSL) in the data communication network.

15. The method of claim 1, further comprising:
receiving, at the authentication server, a third request from the client for content, the third request comprising the configuration data;
obtaining, from the memory area accessible to the authentication server, the authentication token associated with the received configuration data in response to the received request; and
delivering the requested content to the client with the obtained authentication token as the shared secret.

16. One or more computer readable storage media having computer-executable instructions for performing the method recited in claim 1.

17. A system for establishing a shared secret with a client coupled to a data communication network, said system comprising:
an affiliate server coupled to the data communication network for providing content to the client, said affiliate server having a web page including a frame;
an authentication server coupled to the data communication network, said authentication server being configured for:
receiving a first request from the client, wherein said first request is a request to establish a shared secret;
provisioning, to the client in response to receiving the first request, an authentication token as the shared secret, wherein said provisioned authentication token is for use by a user accessing the client to authenticate the authentication server,
delivering, to the client for storage, configuration data identifying the provisioned authentication token,
receiving, from the client via the affiliate server, a second request, wherein said second request is a request for content and comprises the configuration data,
comparing an address of the affiliate server to a list of valid referrers to determine whether the affiliate server is a valid referrer to the authentication server, and
obtaining, from a memory area accessible to the authentication server, the authentication token associated with the received configuration data and delivering, to the client via the frame of the web page of the affiliate server, the requested content and the obtained authentication token as the shared secret in response to determining the affiliate server is a valid referrer to the authentication server.

* * * * *